(12) United States Patent
Casillas et al.

(10) Patent No.: US 7,978,936 B1
(45) Date of Patent: Jul. 12, 2011

(54) INDICATING A CORRESPONDENCE BETWEEN AN IMAGE AND AN OBJECT

(75) Inventors: Amy Casillas, San Jose, CA (US); Lubomir Bourdev, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1077 days.

(21) Appl. No.: 11/342,225

(22) Filed: Jan. 26, 2006

(51) Int. Cl.
*G06K 9/54* (2006.01)
*G06K 9/00* (2006.01)

(52) U.S. Cl. ........ 382/305; 382/118; 707/914; 707/915; 715/838

(58) Field of Classification Search .................. 382/118, 382/305; 707/104.1; 345/642; 715/764, 715/803, 821, 823, 835, 838, 839
See application file for complete search history.

(56) References Cited

U.S. PATENT DOCUMENTS

| | | | |
|---|---|---|---|
| 4,651,146 A | 3/1987 | Lucash et al. | |
| 5,943,093 A | 8/1999 | Anderson et al. | |
| 5,963,203 A | 10/1999 | Goldberg et al. | |
| 6,182,069 B1 | 1/2001 | Niblack et al. | |
| 6,324,555 B1 | 11/2001 | Sites | |
| 6,366,296 B1 * | 4/2002 | Boreczky et al. | 715/719 |
| 6,408,301 B1 * | 6/2002 | Patton et al. | 707/741 |
| 6,714,672 B1 | 3/2004 | Berestov et al. | |
| 6,721,733 B2 * | 4/2004 | Lipson et al. | 707/3 |
| 6,728,728 B2 | 4/2004 | Spiegler et al. | |
| 6,879,709 B2 | 4/2005 | Tian et al. | |
| 6,940,545 B1 | 9/2005 | Ray et al. | |
| 7,155,036 B2 | 12/2006 | Li | |
| 7,171,023 B2 | 1/2007 | Kim et al. | |
| 7,171,630 B2 | 1/2007 | O'Leary et al. | |
| 7,203,367 B2 * | 4/2007 | Shniberg et al. | 382/224 |
| 7,274,832 B2 | 9/2007 | Nicponski | |
| 7,343,365 B2 | 3/2008 | Farnham et al. | |
| 7,403,642 B2 * | 7/2008 | Zhang et al. | 382/118 |
| 7,477,805 B2 * | 1/2009 | Ohtsuka et al. | 382/305 |
| 7,519,200 B2 | 4/2009 | Gokturk et al. | |
| 7,587,101 B1 | 9/2009 | Bourdev | |
| 2001/0053292 A1 | 12/2001 | Nakamura | |
| 2002/0054059 A1 * | 5/2002 | Schneiderman | 345/700 |
| 2002/0074398 A1 | 6/2002 | Lancos et al. | |
| 2002/0103813 A1 | 8/2002 | Frigon | |
| 2003/0023754 A1 | 1/2003 | Eichstadt et al. | |
| 2003/0033296 A1 | 2/2003 | Rothmuller et al. | |
| 2003/0158855 A1 * | 8/2003 | Farnham et al. | 707/102 |

(Continued)

OTHER PUBLICATIONS

Pentland et al. (Jun. 1996) "Photobook: Content-based manipulation of image databases." Int'l J. Computer Vision, vol. 18 No. 3, pp. 233-254.*

(Continued)

*Primary Examiner* — Bhavesh M Mehta
*Assistant Examiner* — Barry Drennan
(74) *Attorney, Agent, or Firm* — Van Pelt, Yi & James LLP

(57) ABSTRACT

Indicating an object is disclosed. Indicating an object includes receiving an indication associated with selecting an image and providing a second indication that a set of one or more objects correspond to the image, wherein the objects have been detected from the image. Indicating an image is disclosed. Indicating an image includes receiving an indication associated with selecting an object, wherein the object has been detected from an image and displaying the image such that a correspondence between the selected object and the image is conveyed.

33 Claims, 10 Drawing Sheets

U.S. PATENT DOCUMENTS

| | | |
|---|---|---|
| 2003/0210808 A1 | 11/2003 | Chen et al. |
| 2004/0008906 A1 | 1/2004 | Webb |
| 2004/0017930 A1 | 1/2004 | Kim et al. |
| 2004/0060976 A1 | 4/2004 | Blazey et al. |
| 2004/0064455 A1 | 4/2004 | Rosenzweig et al. |
| 2004/0101212 A1 | 5/2004 | Fedorovskaya et al. |
| 2004/0204635 A1 | 10/2004 | Scharf et al. |
| 2004/0267612 A1 | 12/2004 | Veach |
| 2005/0011959 A1 | 1/2005 | Grosvenor |
| 2005/0013488 A1 | 1/2005 | Hashimoto et al. |
| 2005/0025376 A1 | 2/2005 | Ishida |
| 2005/0041114 A1 | 2/2005 | Kagaya |
| 2005/0046730 A1* | 3/2005 | Li .............................. 348/333.12 |
| 2005/0050027 A1 | 3/2005 | Yeh et al. |
| 2005/0063568 A1 | 3/2005 | Sun et al. |
| 2005/0105779 A1 | 5/2005 | Kamei |
| 2005/0105806 A1* | 5/2005 | Nagaoka et al. .............. 382/224 |
| 2005/0117870 A1 | 6/2005 | Lee |
| 2005/0128221 A1 | 6/2005 | Aratani et al. |
| 2005/0129276 A1 | 6/2005 | Haynes et al. |
| 2005/0147302 A1 | 7/2005 | Leung |
| 2005/0157952 A1* | 7/2005 | Gohda et al. .................. 382/305 |
| 2005/0172215 A1 | 8/2005 | Squibbs et al. |
| 2005/0196069 A1 | 9/2005 | Yonaha |
| 2005/0207630 A1 | 9/2005 | Chan et al. |
| 2005/0213793 A1 | 9/2005 | Oya et al. |
| 2005/0285943 A1 | 12/2005 | Cutler |
| 2006/0008145 A1 | 1/2006 | Kaku |
| 2006/0008152 A1* | 1/2006 | Kumar et al. ................. 382/190 |
| 2006/0032916 A1 | 2/2006 | Mueller et al. |
| 2006/0050934 A1* | 3/2006 | Asai .............................. 382/118 |
| 2006/0053364 A1 | 3/2006 | Hollander et al. |
| 2006/0071942 A1 | 4/2006 | Ubillos et al. |
| 2006/0098737 A1 | 5/2006 | Sethuraman et al. |
| 2006/0120572 A1 | 6/2006 | Li et al. |
| 2006/0140455 A1 | 6/2006 | Costache et al. |
| 2006/0161588 A1* | 7/2006 | Nomoto ..................... 707/104.1 |
| 2006/0171573 A1 | 8/2006 | Rogers |
| 2006/0222243 A1 | 10/2006 | Newell et al. |
| 2006/0239515 A1* | 10/2006 | Zhang et al. .................. 382/118 |
| 2006/0251338 A1* | 11/2006 | Gokturk et al. ............... 382/305 |
| 2006/0251339 A1* | 11/2006 | Gokturk et al. ............... 382/305 |
| 2007/0071323 A1 | 3/2007 | Kontsevich et al. |
| 2007/0081744 A1 | 4/2007 | Gokturk et al. |
| 2007/0098303 A1* | 5/2007 | Gallagher et al. ............ 382/305 |
| 2007/0183638 A1 | 8/2007 | Nakamura |
| 2007/0242856 A1 | 10/2007 | Suzuki et al. |
| 2008/0080745 A1 | 4/2008 | Vanhoucke et al. |
| 2009/0016576 A1* | 1/2009 | Goh et al. ..................... 382/118 |
| 2009/0160618 A1 | 6/2009 | Kumagai et al. |

OTHER PUBLICATIONS

Ma et al. (Sep. 2000) "An indexing and browsing system for home video." Proc. 2000 European Signal Processing Conf., pp. 131-134.*

Cox et al. (Jan. 2000) "The Bayesian image retrieval system, PicHunter: theory, implementation, and psychophysical experiments." IEEE Trans. on Image Processing, vol. 9 No. 1, pp. 20-37.*

Nakazato et al. (Aug. 2003) "ImageGrouper: a group-oriented user interface for content-based image retrieval and digital image arrangement." J. Visual Languages and Computing, vol. 14 No. 4, pp. 363-386.*

Girgensohn et al. (Oct. 2004) "Leveraging face recognition technology to find and organize photos." Proc. 6th ACM SGMM Int'l Workshop on Multimedia Information Retrieval, pp. 99-106.*

"Notes and Tags". p. 3 pf 6. http://www.flickr.com/learn_more_3.gne.

Riya—Photo Search. http://www.riya.com.

Riya—Photo Search. http://www.riya.com/corp/learn-more.jsp.

Riya—Photo Search. http://www.riya.com/corp/learn-more-s2.jsp.

Riya—Photo Search. http://www.riya.com/corp/learn-more-s3.jsp.

Riya—Photo Search. http://www.riya.com/corp/learn-more-s5.jsp.

Riya—Photo Search. http://www.riya.com/corp/learn-more-s6.jsp.

Gormish, Michael J.. "JPEG 2000: Worth the Wait?" Ricoh Silicon Valley, Inc. pp. 1-4.

Yang et al. "Detecting Faces in Images: A Survey." IEEE Transactions of Pattern Analysis and Machine Intelligence, vol. 4, No. 1. Jan. 2003. pp. 34-58.

Sun et al. "Quantized Wavelet Features and Support Vector Machines for On-Road Vehicle Detection." Dept. of Computer Science, U. of Nevada, Reno & e-Technology Dept., Ford Motor Company, Dearborn, MI. pp. 1-6.

Schneiderman, Henry. "A Statistical Approach to 3D Object Detection." Robotics Institute, Carnegie Mellon University, Pittsburgh, PA. 2000.

Yang, Ming-Hsuan. "Recent Advances in Face Detection." Honda Research Institute, Mountain View, CA.

U.S. Appl. No. 11/097,951, Newell et al.

Jennifer Granick, "Face It: Privacy Is Endangered", Dec. 7, 2005.

Michael Arrington, "First Screen Shots of Riya". Oct. 26, 2005.

Adobe® Photoshop® Album 2.0 User Guide for Windows®, Adobe Systems Incorporated, 2003.

Adobe® Photoshop® Elements 3.0 Getting Started Guide for Windows®, Adobe Systems Incorporated, 2004.

Adobe® Photoshop® Elements 3.0 Feature Highlights Adobe Systems Incorporated, 2004.

* cited by examiner

INDICATING A CORRESPONDENCE BETWEEN AN IMAGE AND AN OBJECT

BACKGROUND OF THE INVENTION

Automatic detection techniques can be used to detect objects in an image. For example, a face detection process can detect faces of people in an image. With digital cameras becoming increasingly popular, more and more digital images are being created for personal and commercial use. Face detection technology can be applied to these digital images to detect faces. However, existing methods for handling faces once they have been detected are limited. Improved techniques for managing faces or other objects resulting from a detection process would be useful.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In some embodiments, the technique is performed by a processor and a memory coupled with the processor, wherein the memory is configured to provide the processor with instructions which when executed cause the processor to perform one or more steps. In some embodiments, the technique is performed by a computer program product being embodied in a computer readable storage medium and comprising computer instructions for performing one or more steps. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
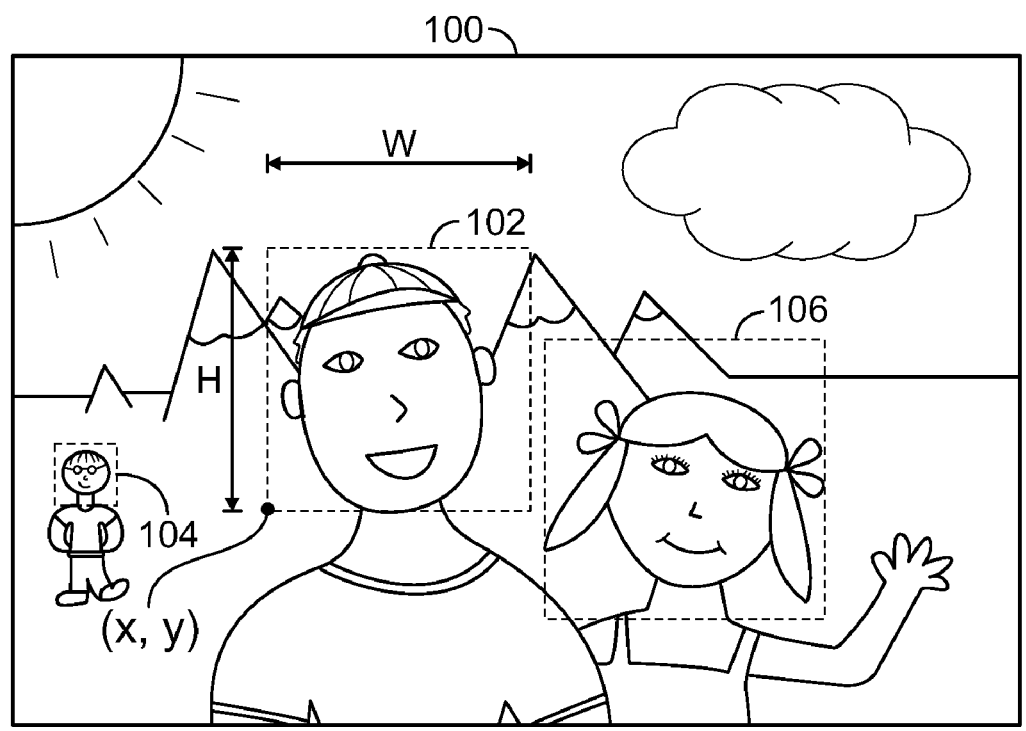
FIG. 1A is an embodiment of an image including objects resulting from a detection process.

FIG. 1A is an embodiment of an image including objects resulting from a detection process. In the example shown, image 100 may be a file in a variety of formats, including Joint Photographic Experts Group (JPEG), Graphics Interchange Format (GIF), Tagged Image File Format (TIFF), and Portable Network Graphics (PNG). In some embodiments, image 100 is generated using a digital camera. Although images may be described in the examples herein, any data, including audio, video, streaming video, or graphical data, may be used in various embodiments. For example image 100 may be a frame of video.

Automatic detection processing is performed on image 100. Automatic detection processing detects occurrences of a detection object in an image. Automatic detection processing may be performed using various techniques in various embodiments. For example, Eigenfaces, Adaboost, or neural networks may be used. A two dimensional pattern matching technique may be used. A three dimensional model of the object may be used to approximate the object. Detection may be performed based on the model. Adobe® Photoshop® Elements may be used to perform automatic face detection on photographs.

Objects are output by the automatic detection process and are believed by the automatic detection process to include an occurrence of the detection object. Automatic detection processes may not necessarily attempt to detect a particular detection object (for example, the face of a particular person). Rather, the process may attempt to detect any occurrence of a detection object in an image (for example, any face). In some embodiments, including this example, each object includes one and only one occurrence of a detection object. Examples of detection objects include a face, person, animal, car, boat, book, table, tree, mountain, etc.

An object resulting from a detection process may be referred to as a "detected object" or an "object that has been detected from an image." A detected object may include (an occurrence of) a detection object. As used herein, "face" may refer to either an object that includes a face or a face as a detection object (i.e., a face that is shown in an object).

Objects may be associated with a subimage (i.e., a portion of an image) and may be described in a variety of ways. In this example, objects are approximated with a rectangle. In some embodiments, objects output by an automatic detection process have a different shape, such as a round shape. Object 102 may be described by coordinates (x, y). Coordinates (x, y) may describe the location of the lower left corner of object 102 with respect to the origin (i.e., lower left corner of image 100). Any appropriate unit may be used for coordinates (x, y). Object 102 in this example is also described by a height, H, and a width, W. In some embodiments, objects output by an automatic detection process have a fixed aspect ratio (i.e., a fixed width to height ratio). For example, although the sizes of objects 102 and 104 are different, the aspect ratios of the two objects may be the same.

Additional information associated with each object may be output by an automatic detection process. In some embodiments, a probability that a given object includes the detection object is output. For example, object 106 may be associated with a probability that object 106 includes a face. In some embodiments, one or more angles are output by an automatic detection process. For example, one angle may describe the rotation of the detection object in the image plane (face tilted side-to-side), a second angle—in the 3D space along the vertical axis (frontal vs. profile face, or a rotation) and a third angle—in the 3D space along the horizontal axis (face looking up or down, or a tilt up or down).

Automatic detection processes can be imperfect. Sometimes, an automatic detection process may not be able detect an occurrence of a detection object. For example, some face detection processes may not be able to detect the face of a person if the face is too small in an image. An automatic detection process can also generate "false alarms." A face detection process may output an object that does not include a face.

In some embodiments, additional processes may be applied to image 100 or an associated object after automatic detection is performed. For example, a face identification process may be performed where objects are evaluated to determine whether they contain the face of a particular person. Objects may be identified in various ways in various embodiments. For example, a technique based on Adaboost, Linear Discriminant Analysis (LDA), or principal component analysis (PCA) may be used to perform object identification. In some embodiments, a face that is identified is automatically tagged. Face identification may be imperfect. For example, a face may be misidentified or mistagged. In some embodiments, a probability that the face is identified correctly is provided. In some embodiments, a face matching process is performed, where multiple objects from multiple images are compared and similar faces are matched together. In some embodiments, a process generates a new object or modifies an existing object. For example, the aspect ratio of an object may be adjusted.

Object detection may be automatic or manual. A user may examine an image, detect an occurrence of a detection object, and specify the portion of the image associated with the new object. For example, a user may have drawn a box around any of faces 102, 104, and 106 to detect a face. The output of a manual detection process may include the same information as the output of an automatic detection process. The probability that a manually detected object includes the detection object may be set to 1.

Table 1 lists examples of information that may be stored for various objects. This information may be output by an object detector. In this example, objects 1-5 were automatically detected and object 6 was manually detected. Such information may be stored in one or more of a database, file metadata, file, or in any other appropriate way.

TABLE 1

| Object ID | Source File ID | Coordinates of Origin | Width | Height | Angle | P(Object = Detection Object) | Date Object Detected | Manually or Automatically Detected | Identity Confirmed? |
|---|---|---|---|---|---|---|---|---|---|
| 1 | 1 | x0, y0 | 5 | 8 | 0 | 0.8 | Jan. 1, 2005 | Automatically | yes |
| 2 | 1 | x1, y1 | 5 | 7 | 5 | 0.7 | Jan. 1, 2005 | Automatically | yes |
| 3 | 1 | x2, y2 | 1 | 1 | 0 | 0.5 | Jan. 1, 2005 | Automatically | no |
| 4 | 2 | x3, y3 | 2 | 2 | 0 | 0.6 | Nov. 2, 2005 | Automatically | yes |
| 5 | 2 | x4, y4 | 3 | 4 | 20 | 0.7 | Nov. 3, 2005 | Automatically | yes |
| 6 | 2 | x5, y5 | 1 | 1 | 0 | 1 | Nov. 22, 2005 | User | |

Figure 1B:
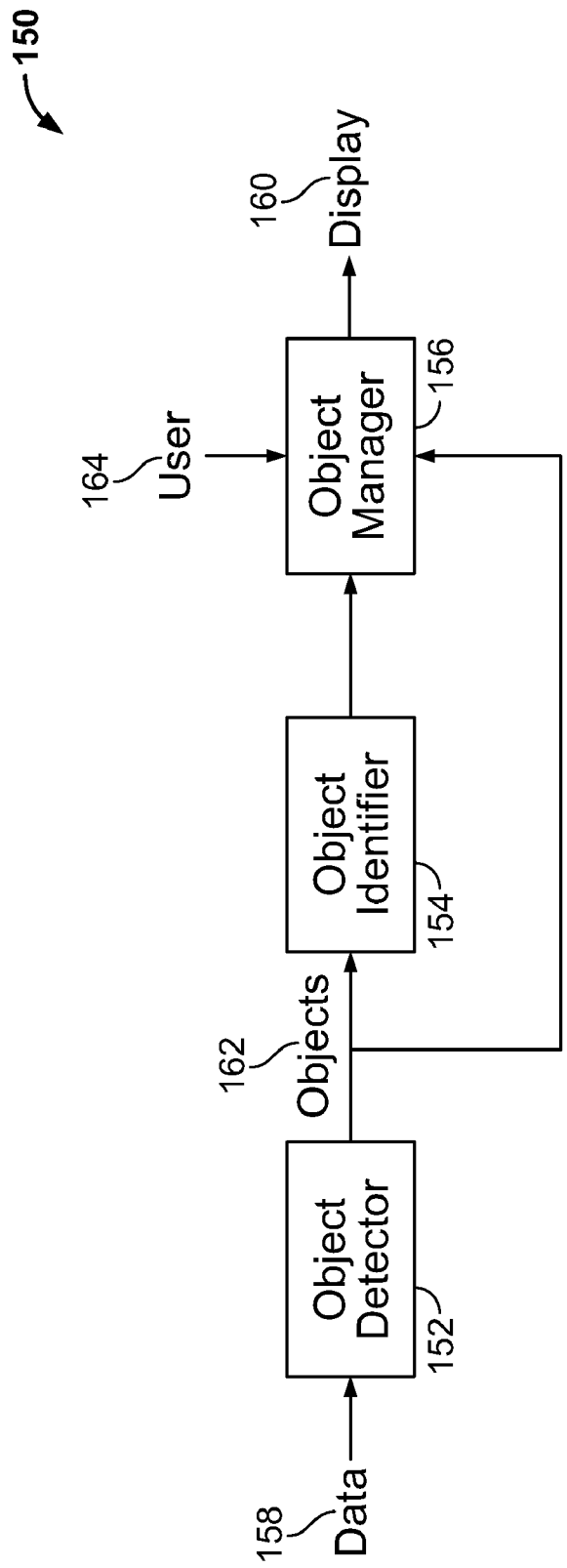
FIG. 1B is a block diagram illustrating an embodiment of a system for detecting and processing objects.

FIG. 1B is a block diagram illustrating an embodiment of a system for detecting and processing objects. In this example, system 150 includes object detector 152, object identifier 154, and object manager 156. Data 158 is input to object detector 152. Data 158 may include an image, video, audio clip, and/or other data. Object detector 152 performs an object detection process to detect occurrences of detection objects in data 158. Object detector 152 may detect any occurrence of a detection object (e.g., any face). Object detector 152 provides detected objects 162 as output.

Objects 162 are provided as input to object identifier 154, which identifies detection objects. For example, object detector 152 may detect any face, and object identifier 154 may identify the face as belonging to a specific person. Object identifier may output one or more names associated with one or more of objects 162. In some embodiments, object identifier 154 assigns a tag (such as the tag "Bob") to an object. Objects 162 and the output of object identifier 154 are provided as input to object manager 156. User input 164 may also be provided as input to object manager 156. In some embodiments, system 150 does not include object identifier 154.

Object manager 156 manages objects 162, including organizing, tagging, and displaying information associated with objects 162 on display 160. For example, object manager 156 may manage the tagging of objects, including assigning, storing, and obtaining tag information. Object manager 156 may manage the display of detected objects and other information. For example, object manager 156 may indicate a correspondence between an image and an object, as more fully described below.

Figure 2:
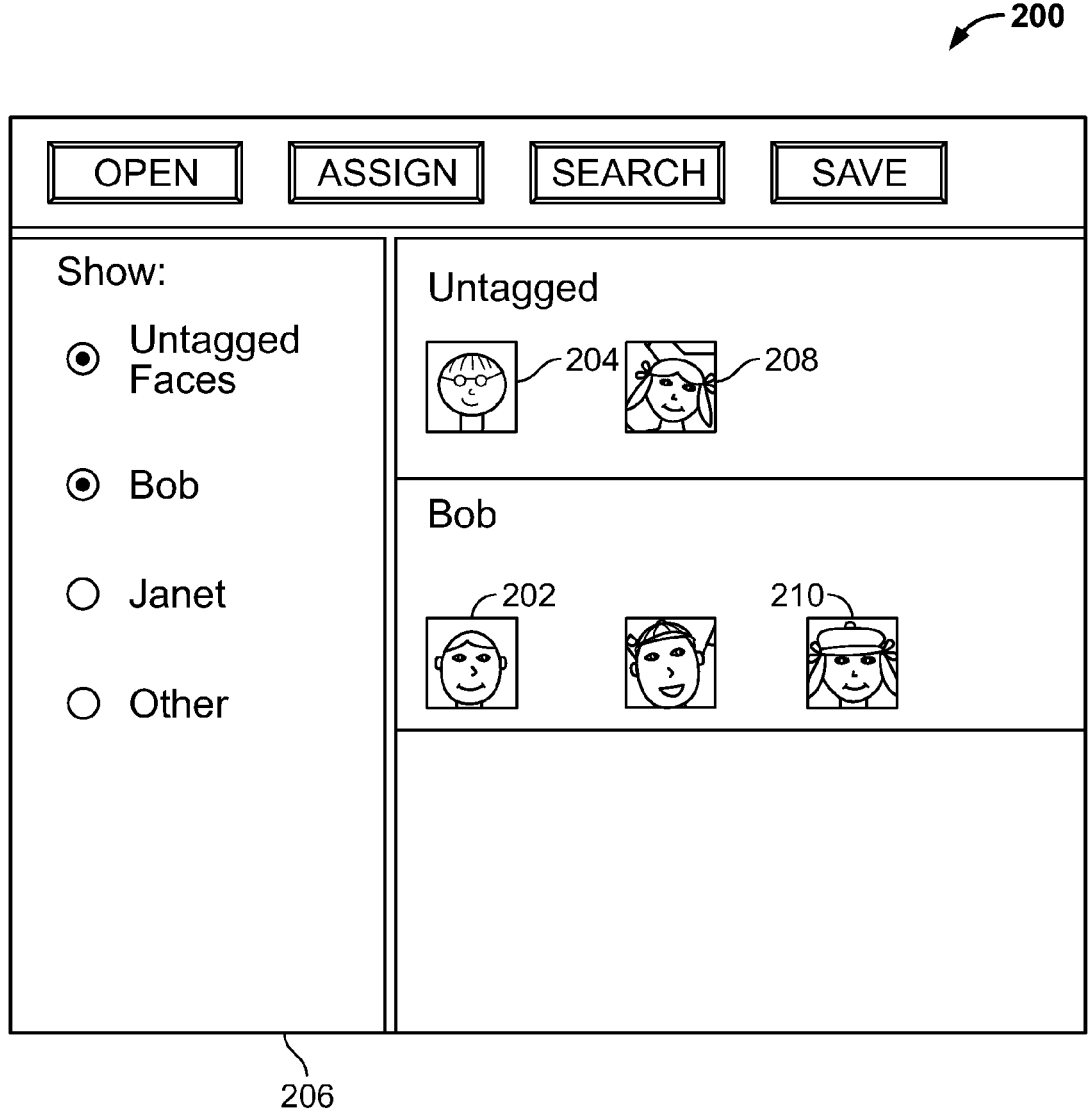
FIG. 2 illustrates an embodiment of an interface for viewing objects.

FIG. 2 illustrates an embodiment of an interface for viewing objects. In the example shown, interface 200 displays objects resulting from face detection performed on images. Some of the objects in this example are tagged while other objects are untagged. Object 202, for example, has been assigned a tag of "Bob" while object 204 is untagged. Object 210, which may include someone other than Bob (e.g., Janet), may have been mistagged, perhaps by a user or a face identification process. Interface 200 may be used to tag faces or other objects. Interface 200 may include results from a search query.

Tagging refers to the process of assigning a tag to an object or image. A user or an automatic process may assign a tag. A tag includes tag data. Tag data may be user specified or machine specified. Examples of tag data include a name, place, event, date, etc. A tag may represent descriptive information associated with an object or image. For example, a vacation photographed may be tagged with "Boston," "Mom," or "Fourth of July." Tag data may include any type of data, including text, image, audio, or video. Tag data may include free form text or keywords. The same tag may be assigned to more than one object and/or image. An object or image may have multiple tags.

In some embodiments, the output of an object detector includes tag data for an object. For example, the coordinates of an object may be considered tag data for an object. In some embodiments, the output of an object identifier includes tag data for an object, where the tag data includes a name. In some embodiments, a tag may be designated as a particular type of tag, such as a name tag. A name tag may be assigned to an object that includes a face.

Table 2 lists examples of information that may be stored for various tags. Such information may be stored in one or more of a database, file metadata, file, or in any other appropriate way.

TABLE 2

| Tag ID | Tag Data | Object(s) Being Tagged | P(Object = Tag Data) | User or Machine Assigned | User or Machine Specified Tag Data | Tag Icon or Object ID to Use for Tag Icon |
|---|---|---|---|---|---|---|
| 1 | Bob | 1, 6 | 0.6, 1 | Machine, User | User | Object ID 1 |
| 2 | Janet | 4 | 0.5 | User | User | Object ID 2 |
| 3 | teeth | 1 | 1 | User | User | icon1.jpg |
| 4 | hat | 1 | 1 | User | User | icon2.jpg |
| 5 | mountains | 1, 2, 3 | 0.8, 0.7, 1 | Machine, Machine, User | Machine | icon3.jpg |

In the example of Table 2, tag 1 (having tag data "Bob") has been assigned to object 1 and object 6. The probability that object 1 includes Bob is 0.6. The probability that object 6 includes Bob is 1. For example, a face detection process may have output object 1 and a user may have generated object 6. A user is assumed to detect faces without any errors, while a face detection process may be imperfect. The tag data "Bob" is obtained from the user and the value in the sixth column indicates this. The tag icon to use for tag 1 is set to object ID 1. The tag icon is more fully described below.

Tags may be organized hierarchically. For example, tags may be organized into categories and subcategories. Examples of categories include people, places, and events. Subcategories might include family, USA, and sports. In some embodiments, side bar 206 displays tags hierarchically. For example, "people" may be displayed in the first line and "family" may be displayed as indented in the second line.

In some embodiments, objects, images, video, and/or audio may be organized into collections. For example, photos to use in a slideshow may form a collection. A collection tag may be a particular type of tag. Collections may be displayed in side bar 206.

In some embodiments, the interface used varies from that of interface 200. For example, an interface may have no concept of tags, and an interface may not necessarily display objects based on a tag. Faces 202 and 204 may, for example, be displayed based on a date. The date may be the date a photograph is taken, or may be the date automatic detection is performed.

Figure 3:
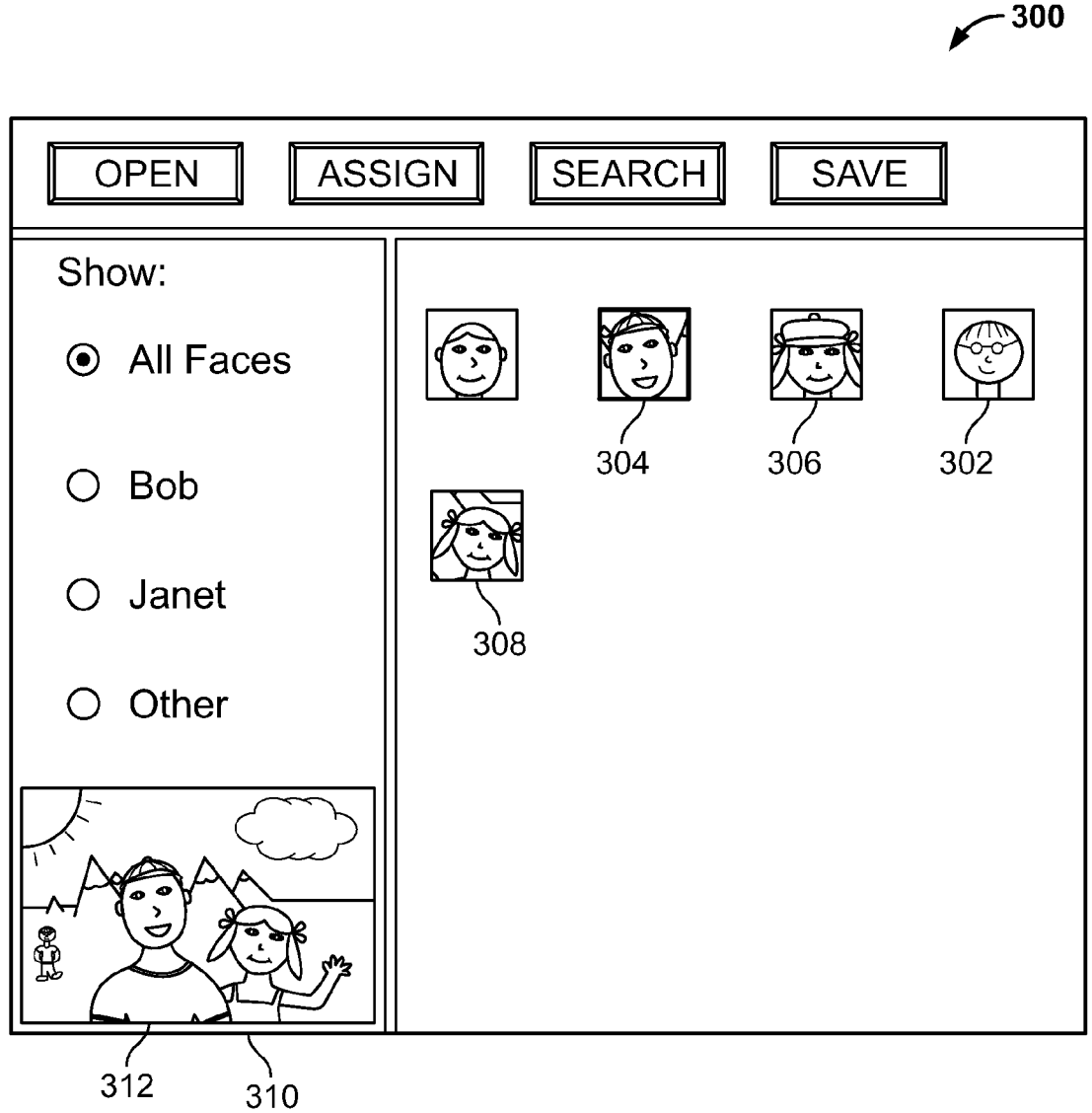
FIG. 3 illustrates an embodiment of an interface for viewing objects when an object is selected.

FIG. 3 illustrates an embodiment of an interface for viewing objects where an object is selected. In the example shown, interface 300 displays objects resulting from face detection performed on images. Any number of faces may be displayed.

In some embodiments, interface 300 shows interface 200 when an "All Faces" option is selected. In some embodiments, the detection object is not a face and different objects are accordingly detected and displayed.

One or more objects may be selected. To select objects, an input device may be used to interact with interface 300. The input device can be a mouse, a stylus, a touch sensitive display, or any pointing device. Using an input device, one or more objects may be selected from the objects displayed in interface 300. For example, by placing a mouse cursor over object 304 and clicking the mouse, object 304 may be selected. Clicking an object may toggle the object between a selected and an unselected state. If a user clicks object 306 after selecting object 304 (e.g., while holding down the "Control" button), object 306 may be selected in addition to object 304. Clicking a mouse cursor above object 306 one more time may unselect object 306. In some cases, multiple objects are selected. In other cases, a single object is selected. Objects can be selected based on a criterion. For example, all objects associated with certain tag(s) may be selected.

An object may be selected for various purposes. For example, an object may be selected in order to perform an action associated with the object. Actions such as saving, exporting, tagging, copying, editing, or opening may be performed. Such actions may be performed with a selected object as the target. For example, in order to save an object, the object is selected and a "SAVE" button is pressed.

When an object is selected, the corresponding image is displayed. The corresponding image includes the image from which the object was detected. In this example, object 304 is selected, as shown by a thicker border around object 304. In response, side bar 310 displays image 312. Image 312 is the image from which object 304 is detected. If more than one object is selected, more than one image may be displayed. In some embodiments, selecting object 304 causes image 312 to be selected. For example, side bar 310 may display multiple images. When object 304 is selected, image 312 is selected among the multiple images. As with object 304, a thicker border around image 312 may indicate that image 312 is selected. In some embodiments, unselecting an object causes an associated image to be removed from display. For example, if object 304 is unselected, image 312 may be removed from side bar 310. In some embodiments, no images are displayed if no objects are selected. In some embodiments, if more than one object is selected, the most recently selected object's corresponding image is indicated.

In some embodiments, an object may be detected from video, audio, or other data. Thus, video, audio, or other data may be displayed in response to selecting an object. For example, an object may have been detected from video. Selecting such an object may cause video data to be displayed. The video data may be displayed as text (e.g., a filename), an icon corresponding to a video file, or in any other way. Video data may be played. In the case of an audio file, selecting an object associated with voices from the audio file may cause the audio file to be displayed. Selecting an object associated with a sound in the audio file may cause the audio file to be displayed. In some embodiments, a lower resolution or bandwidth version of video, audio, or other data is displayed to reduce the amount of resources consumed.

In some embodiments, each object is detected from one and only one data source. In some embodiments, an object may be detected from more than one data source. For example, the same object may be detected from images that are copies of each other or two videos that include a same portion of video. An object may be associated with more than one audio file. In such cases, one or more of the data sources associated with a given object can be displayed. In some embodiments, all data sources are displayed. In some embodiments, a representative data source is selected and displayed.

In some embodiments, a sequence of interactions or an input device used differs from that described in this example. For example, instead of using a mouse as an input device, a touch sensitive display may be used.

Figure 4:
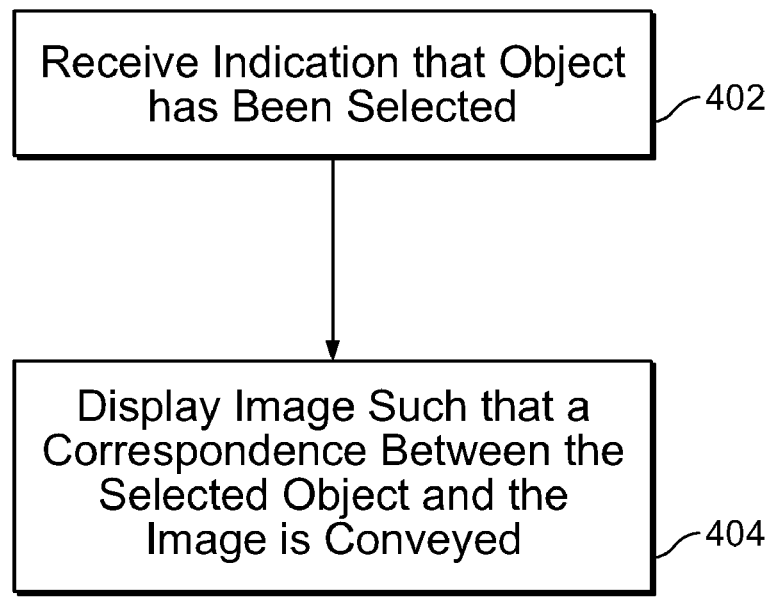
FIG. 4 is a flow chart illustrating an embodiment of a process for indicating an image.

FIG. 4 is a flow chart illustrating an embodiment of a process for indicating an image. In the example shown, a set of one or more objects is detected by a detection process. At 402, an indication that an object has been selected is received. For example, an indication that a user has selected object 304 using a mouse is received. The indication may be triggered by a cursor hovering over the object, double clicking on the object, or any other appropriate sequence of inputs. At 404, an image is displayed such that a correspondence between the selected object and the image is conveyed. For example, image 312, and only image 312, may be displayed. In some embodiments, multiple images are displayed and the correspondence is conveyed visually, for example using a border, a highlight, shading, transparency, etc. Image 312 may be obtained in various ways. For example, in Table 2, each object has a source file ID. By looking up a selected object, the source file can be obtained. A video or audio file may be obtained in a similar way.

The correspondence can be conveyed in various ways. Any visual or other indicator may be used. For example, the image may be highlighted, outlined, scaled up, selected, shown with a thicker border, shown in a separate window, described in text, etc. All other images may be removed from display. A time varying indication may be used. For example, the image may flash.

In this example, an object is selected, and a corresponding image is displayed. In some embodiments, an image is selected and corresponding object(s) are displayed.

Figure 5:
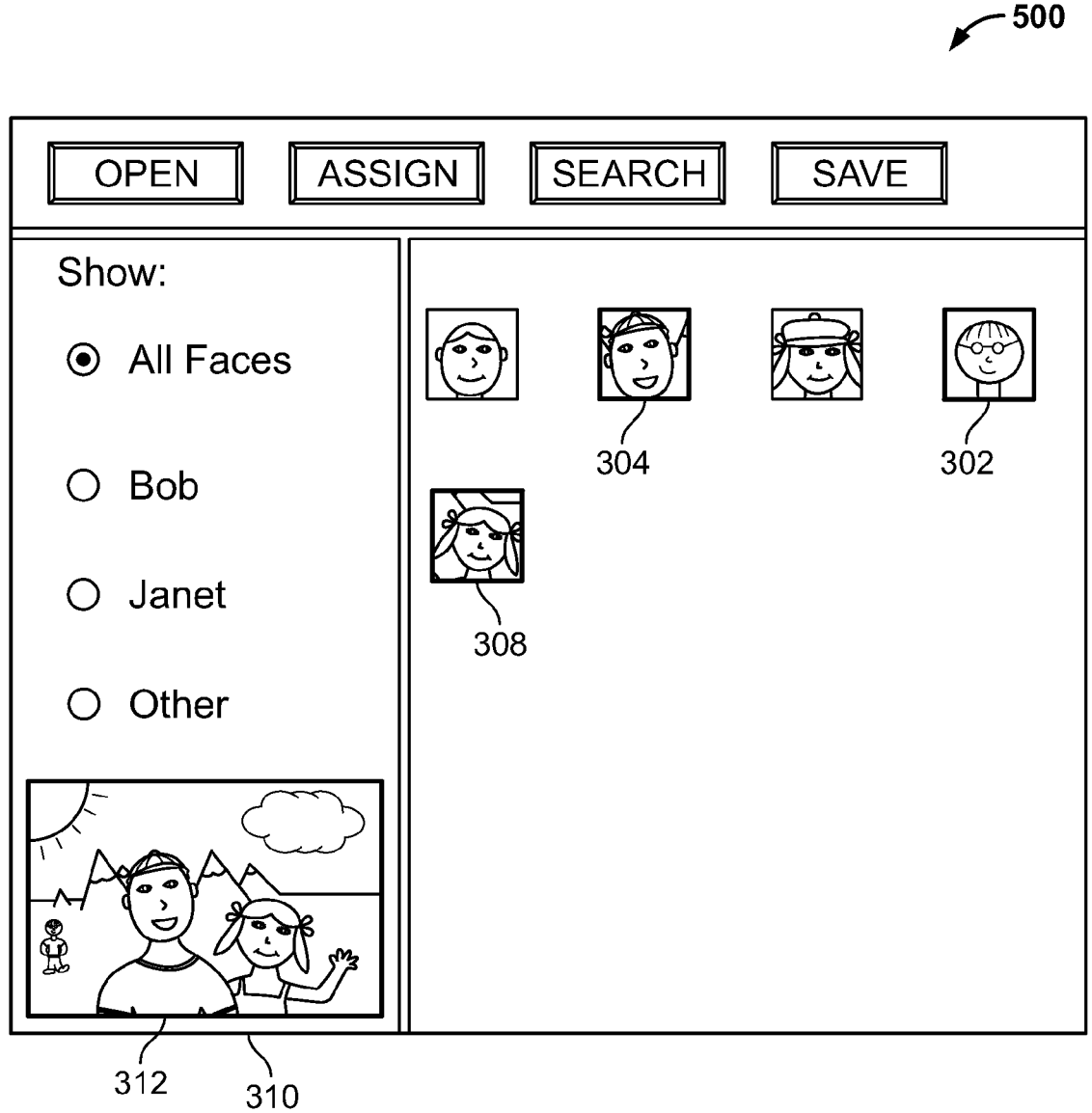
FIG. 5 illustrates an embodiment of an interface for viewing objects when an image is selected.

FIG. 5 illustrates an embodiment of an interface for viewing objects when an image is selected. In the example shown, interface 500 indicates objects associated with selected image 312. A user can select image 312 by clicking on image 312 with a mouse. In response, a thicker border is shown around objects 302, 304, and 308. Objects 302, 304, and 308 are detected from image 312. In some embodiments, objects 302, 304, and 308 are all of the objects detected from image 312. In some embodiments, objects 302, 304, and 308 are a subset of the objects detected from image 312. For example, the subset could include objects that are not yet tagged. The subset of objects indicated may be user configurable. In some embodiments, selecting image 312 causes objects 302, 304, and 308 to be selected.

In this example, objects detected from the selected image are indicated using a thicker border. In some embodiments, only objects that are detected from a selected image are displayed. For example, only objects 302, 304, and 306 are displayed. Objects that are not detected from a selected image may be removed from display.

In some applications, providing an indication that a set of objects corresponds to an image allows a user to quickly find objects that originated from the image. The user can determine that all the faces in the photo were found by an object detection process. For example, a user may want to review the performance of an automatic detection process. By displaying objects that correspond to an image, a user may realize that an object was not detected by the automatic detection process. A user may subsequently rerun the automatic detection process with difference performance parameters (for example, improved performance at the expense of processing time), or may manually detect an undetected object by drawing a box or another appropriate sequence of inputs associated with manual detection.

Indicating objects as described may be used for a variety of other functions. The user can quickly select faces and apply tags to them collectively. This also provides a quick way to find another face that the user may be searching for. For example, if the user knows that Janet was in the picture with Bob, and the user finds Bob's face, the user could select Bob's face, which displays the source photo, and by clicking on that photo, all faces originating from the source photo would be indicated. By scanning the selected faces, the user could quickly find Janet's face.

In some embodiments, one or more images may be selected. For example, multiple images may be shown in side bar 310 and one or more of those images may be selected. In response, objects corresponding to the selected image(s) may be displayed and/or selected. In some embodiments, rather than selecting image 312, image 312 is indicated in some other way, such as by hovering a mouse over image 312 or double clicking on image 312.

Figure 6A:
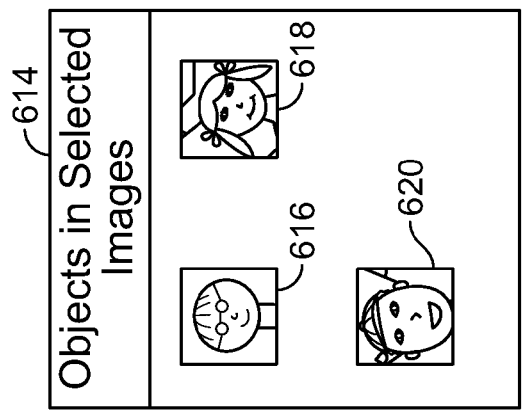
FIG. 6A illustrates an embodiment of an interface for viewing images when an image is selected.
Figure 6A:
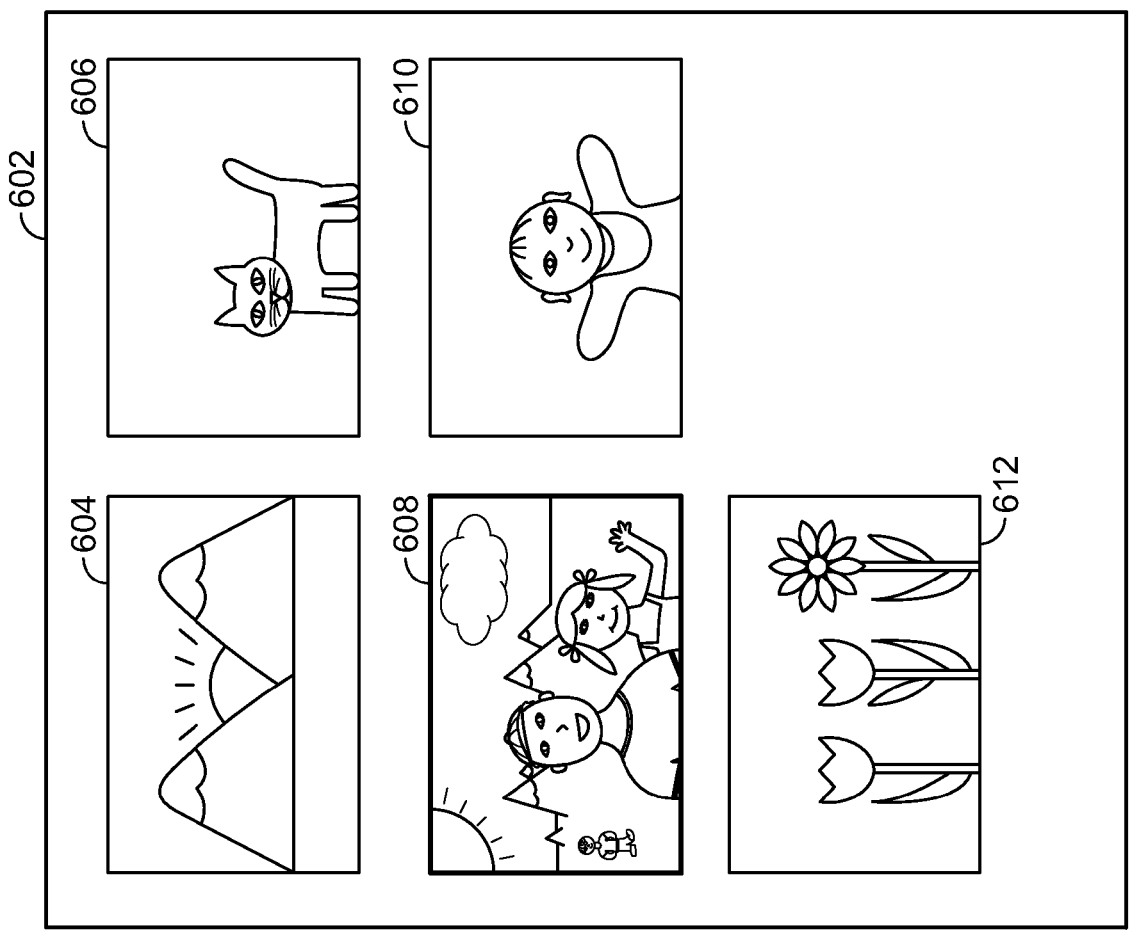

FIG. 6A illustrates an embodiment of an interface for viewing images when an image is selected. In the example shown, interface 602 may be used to browse images, such as photos. Interface 602 displays images 604-612.

In one example, a user selects image 608 by clicking on image 608 with a mouse. In response, interface 614 displays objects 616, 618, and 620. Objects 616, 618, and 620 are detected from image 608. In some embodiments, selecting image 608 causes objects 616, 618, and 620 to be selected. Interface 614 may open in response to selecting image 608, or may already be displayed. For example, interface 614 may be a side bar or a window.

In some embodiments, multiple images may be selected and objects detected from those images may be displayed and/or selected in interface 614.

Figure 6B:
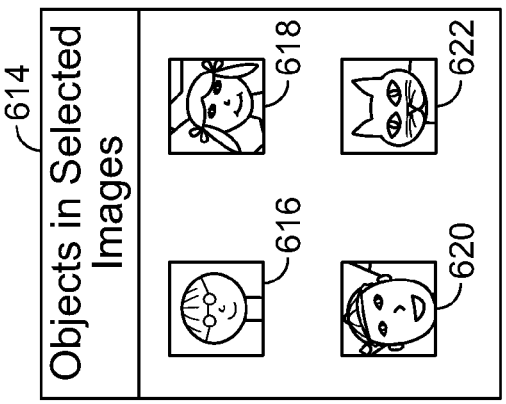
FIG. 6B illustrates an embodiment of an interface for viewing images when more than one image is selected.
Figure 6B:
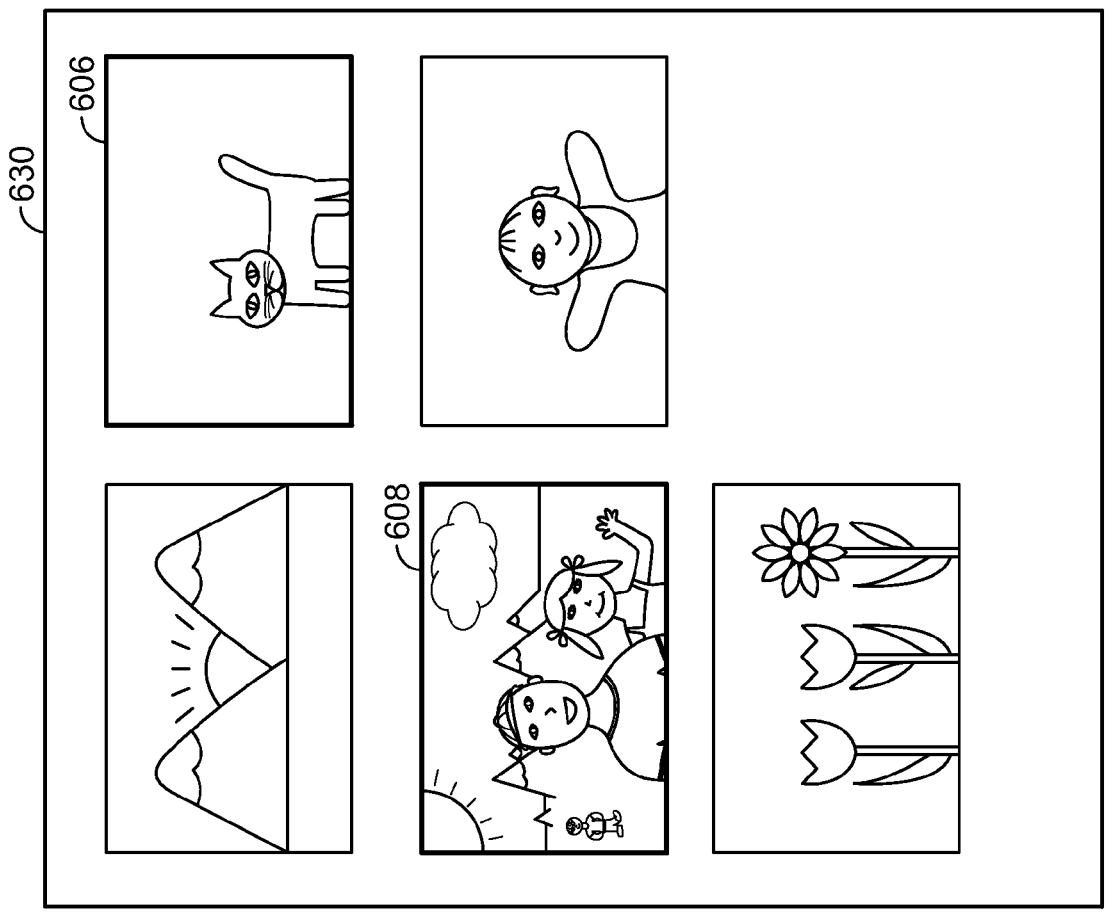

FIG. 6B illustrates an embodiment of an interface for viewing images when more than one image is selected. In the example shown, both images 606 and 608 are selected in interface 630.

For example, a user selects image 608 by clicking on image 608 with a mouse. The user may also select image 606 by holding down the "Control" button and clicking on image 606 with the mouse. In response, interface 614 displays objects 616, 618, 620, and 622. Objects 616, 618, and 620 are detected from image 608. Object 622 is detected from image 606. In some embodiments, selecting images 606 and 608 causes objects 616, 618, 620, and 622 to be selected.

As shown, any object may be displayed in a separate window, such as interface 614. In some embodiments, objects must satisfy some criteria to be indicated, and a user can specify the criteria. For example, a user may specify that only faces be indicated. A user may specify that only untagged objects be indicated. In some embodiments, a checklist may be provided including predefined criteria, and the user may select from the criteria to specify which objects to indicate.

Figure 7:
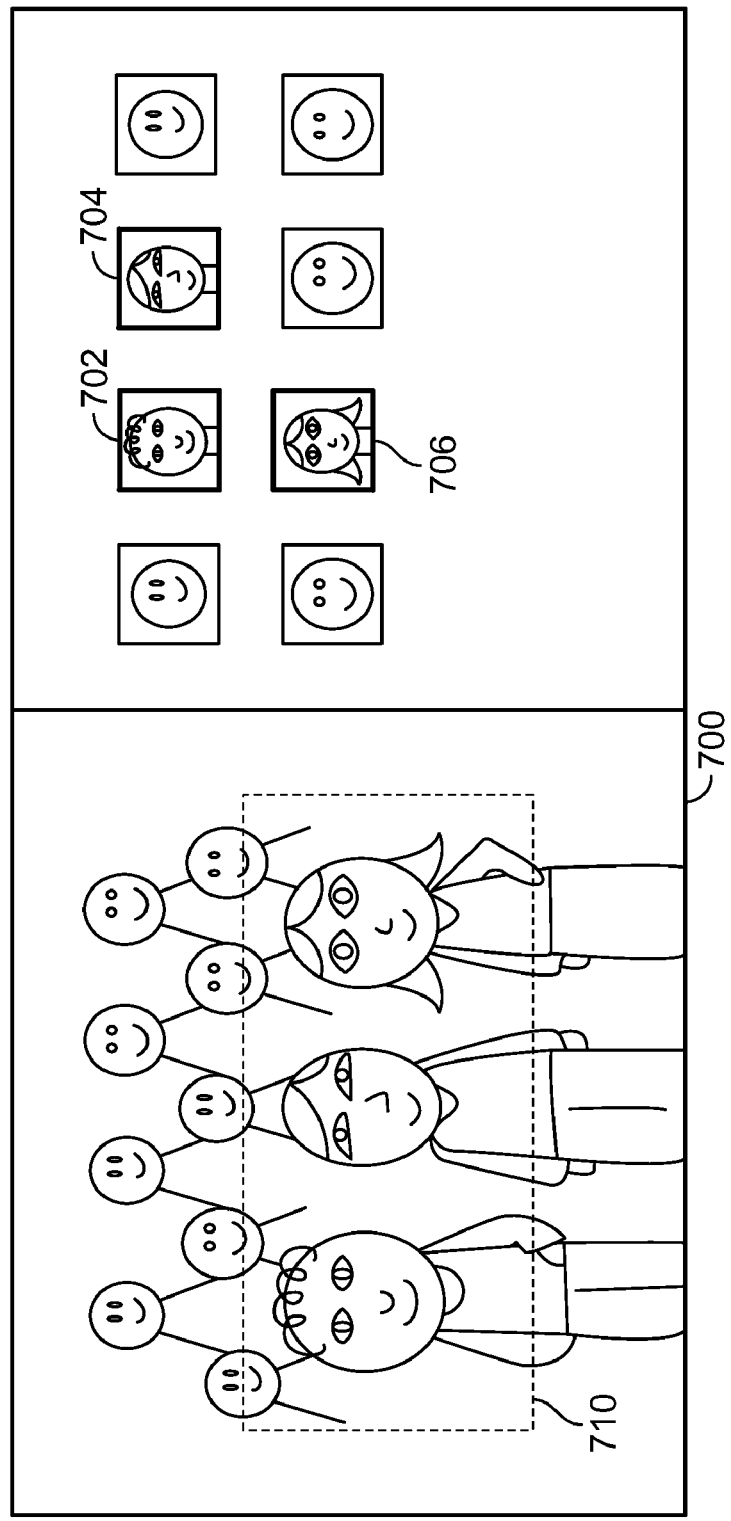
FIG. 7 illustrates an embodiment of an interface for viewing objects when a portion of an image is selected.

FIG. 7 illustrates an embodiment of an interface for viewing objects when a portion of an image is selected. In the example shown, image 700 may be a file in a variety of formats, including JPEG and GIF. In some embodiments, image 700 is generated using a digital camera. In this example, a portion of an image may be selected. For example, a user may use a mouse, pointing device, or other input device to generate selection box 710 in a portion of image 700. Objects found within the selected portion of the image are shown with a thicker border to the right of image 700. In this case, objects 702, 704, and 706 were detected from the portion of the image within selection box 710, so objects 702, 704, and 706 are shown with a thicker border. In some embodiments, creating drawing box 710 causes objects 702, 704, and 706 to be selected. In some embodiments, only objects that are located within a selected portion of an image are displayed. Other objects may be removed from display.

Selecting a portion of an image may be useful when a photo depicts a crowd, and only a subset of the faces in the image are of interest to a user. For example, the rest of the faces may be strangers and the user may not want to tag the faces of strangers. In some embodiments, the user may select the portion of the image corresponding to the strangers (e.g., by drawing a box around the faces in the two rows behind the main subjects), which causes these faces to be selected. The user may then indicate that these faces should not be tagged. For example, a "don't tag selected items" box can be check marked.

Figure 8:
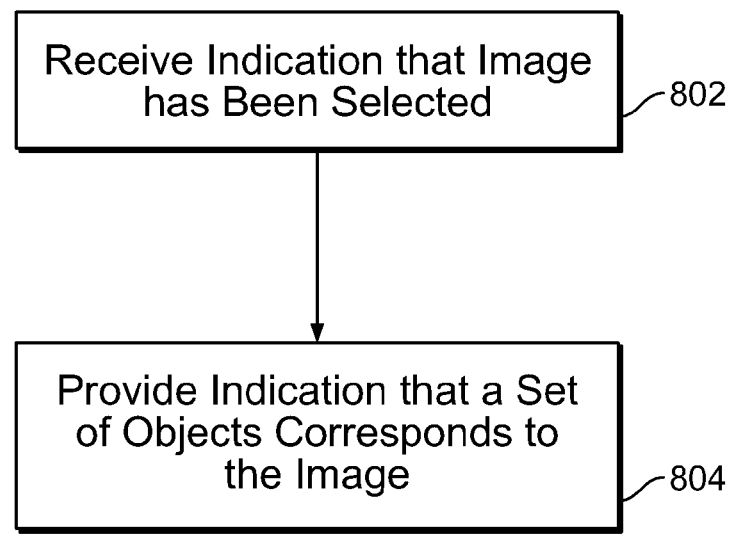
FIG. 8 is a flow chart illustrating an embodiment of a process for indicating a set of objects.

FIG. 8 is a flow chart illustrating an embodiment of a process for indicating a set of objects. In the example shown, a set of one or more objects is detected by a detection process. At 802, an indication that an image has been selected is received. For example, an indication that a user has clicked on image 312 with a mouse is received. At 804, an indication that a set of objects corresponds to the image is provided. For example, objects 302, 304, and 308 are shown with a thicker border. Objects 302, 304, and 308 may be obtained in various ways. For example, in Table 2, each object has a source file ID. Table 2 may be searched for objects having the source file ID of the selected image. Alternatively, a file table may include a list of object IDs for each image.

An indication that a set of objects corresponds to a selected image may be provided in various ways. Any visual or other indicator may be used. For example, the object(s) may be highlighted, outlined, scaled up, selected, shown with a thicker border, shown in a separate window, described in text, etc. All other objects may be removed from display. A time varying indication may be used. For example, the objects may flash. In some embodiments, the image may include boxes indicating the borders of objects that were detected from the image. For example, image 312 may be displayed with boxes as shown in image 100.

In some embodiments, instead of selecting an image at 702, audio or video data is selected. For example, a video file is selected, and objects detected from the video may be displayed in a window. In the case of an audio file, all faces associated with voices from the audio file may be displayed. Objects associated with a sound in the audio file may be displayed.

In some embodiments, 804 may include marking one or more objects on the image. Examples of marking include: a bounding box may be drawn around an object (e.g., dashed lines around the objects, as shown in FIG. 1); an object can remain sharp whereas the rest of the image can be blurred; an object can remain saturated whereas the rest of the image's colors may be washed out; or the image may be zoomed to include just the detected objects. The zoom level from the area that includes just selected objects to the entire image may be user-controlled (for example with a slider). A combination of markings is possible. The markings may be persistent or may be selectively displayed. For example, clicking or hovering a cursor in the area of the object in the displayed image may cause the markings to be displayed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, including:
    displaying a set of two or more displayed objects detected from a plurality of images, wherein each displayed object in the set comprises a subimage of one of the plurality of images;
    receiving, at a processor, a selection of an image having one or more detected objects;
    determining, using the processor, which objects in the set of displayed objects are subimages of the selected image; and
    automatically updating the display of the set of displayed objects to visually indicate a distinction between those objects in the set of displayed objects that are subimages of the selected image and those objects in the set of displayed objects that are not subimages of the selected image.

2. A method as recited in claim 1, wherein updating the display includes removing from the display one or more objects that do not correspond to an object detected in the selected image.

3. A method as recited in claim 1, wherein receiving a selection includes receiving an indication that a cursor is clicked on the image.

4. A method as recited in claim 1, wherein receiving a selection includes receiving an indication that a cursor is hovering over the image.

5. A method as recited in claim 1, wherein the selected image includes video data.

6. A method as recited in claim 1, wherein receiving a selection includes receiving a selection of one or more images.

7. A method as recited in claim 1, wherein the set of one or more displayed objects have been detected from one or more images.

8. A method as recited in claim 1, wherein at least one object in the set of displayed objects has been automatically detected from the image.

9. A method as recited in claim 1, wherein at least one object in the set of displayed objects includes a face.

10. A method as recited in claim 1, wherein updating the display includes increasing a thickness of one or more borders around those objects in the set of displayed objects that are subimages of selected image.

11. A method as recited in claim 1, wherein receiving includes receiving a selection of a portion of the selected image having fewer detected objects than the total number of detected objects in the selected image, each detected object being a subimage of the selected image; and determining includes determining which objects in the set of displayed objects are subimages of the selected portion of the image; and automatically updating includes visually indicating a distinction between those objects in the set of displayed objects that are subimages of the selected portion of the selected image and those objects in the set of displayed objects that are not subimages of the selected portion of the selected image.

12. A system, including:
    a processor; and
    a memory coupled with the processor, wherein the memory is configured to provide the processor with instructions which when executed cause the processor to:
        display a set of two or more displayed objects detected from a plurality of images, wherein each displayed object in the set comprises a subimage of one of the plurality of images;

receive, at a processor, a selection of an image having one or more detected objects;

determine, using the processor, which objects in the set of displayed objects are subimages of the selected image; and automatically update the display of the set of displayed objects to visually indicate a distinction between those objects in the set of displayed objects that are subimages of the selected image and those objects in the set of displayed objects that are not subimages of the selected image.

13. A system as recited in claim 12, wherein the instructions for updating the display include instructions which when executed cause the processor to remove from the display one or more objects that do not correspond to an object detected in the selected image.

14. A system as recited in claim 12, wherein receiving a selection includes receiving an indication that a cursor is clicked on the image.

15. A system as recited in claim 12, wherein receiving a selection includes receiving an indication that a cursor is hovering over the image.

16. A system as recited in claim 12, wherein the selected image includes video data.

17. A system as recited in claim 12, wherein receiving a selection includes receiving a selection of one or more images.

18. A system as recited in claim 12, wherein the set of one or more displayed objects have been detected from one or more images.

19. A system as recited in claim 12, wherein at least one object in the set of displayed objects has been automatically detected from the image.

20. A system as recited in claim 12, wherein at least one object in the set of displayed objects includes a face.

21. A system as recited in claim 12, wherein the instructions for updating the display include instructions which when executed cause the processor to increase a thickness of one or more borders around those objects in the set of displayed objects that are subimages of selected image.

22. A system as recited in claim 12, wherein receive includes receive a selection of a portion of the selected image having fewer detected objects than the total number of detected objects in the selected image, each detected object being a subimage of the selected image; and determine includes determine which objects in the set of displayed objects are subimages of the selected portion of the image; and automatically update includes visually indicate a distinction between those objects in the set of displayed objects that are subimages of the selected portion of the selected image and those objects in the set of displayed objects that are not subimages of the selected portion of the selected image.

23. A computer program product, the computer program product being embodied in a computer readable storage medium and comprising computer instructions for:

displaying a set of two or more displayed objects detected from a plurality of images, wherein each displayed object in the set comprises a subimage of one of the plurality of images;

receiving, at a processor, a selection of an image having one or more detected objects;

determining, using the processor, which objects in the set of displayed objects are subimages of the selected image; and automatically updating the display of the set of displayed objects to visually indicate a distinction between those objects in the set of displayed objects that are subimages of the selected image and those objects in the set of displayed objects that are not subimages of the selected image.

24. A computer program product as recited in claim 23, wherein the computer instructions for updating the display include computer instructions for removing from the display one or more objects that do not correspond to an object detected in the selected image.

25. A computer program product as recited in claim 23, wherein receiving a selection includes receiving an indication that a cursor is clicked on the image.

26. A computer program product as recited in claim 23, wherein receiving a selection includes receiving an indication that a cursor is hovering over the image.

27. A computer program product as recited in claim 23, wherein the selected image includes video data.

28. A computer program product as recited in claim 23, wherein receiving a selection includes receiving a selection of one or more images.

29. A computer program product as recited in claim 23, wherein the set of one or more displayed objects have been detected from one or more images.

30. A computer program product as recited in claim 23, wherein at least one object in the set of displayed objects has been automatically detected from the image.

31. A computer program product as recited in claim 23, wherein at least one object in the set of displayed objects includes a face.

32. A computer program product as recited in claim 23, wherein the computer instructions for updating the display include computer instructions for increasing a thickness of one or more borders around those objects in the set of displayed objects that are subimages of selected image.

33. A computer program product as recited in claim 23, wherein receiving includes receiving a selection of a portion of the selected image having fewer detected objects than the total number of detected objects in the selected image, each detected object being a subimage of the selected image; and determining includes determining which objects in the set of displayed objects are subimages of the selected portion of the image; and automatically updating includes visually indicating a distinction between those objects in the set of displayed objects that are subimages of the selected portion of the selected image and those objects in the set of displayed objects that are not subimages of the selected portion of the selected image.

* * * * *